United States Patent

[11] 3,539,121

| [72] | Inventor | Robert W. Peters<br>Menomonee, Wisconsin |
|---|---|---|
| [21] | Appl. No. | 700,405 |
| [22] | Filed | Jan. 25, 1968 |
| [45] | Patented | Nov. 10, 1970 |
| [73] | Assignee | Lincoln Tool and Manufacturing Company<br>Milwaukee, Wisconsin |

[54] MACHINE FOR WINDING STATORS WITH SKEWED SLOTS
6 Claims, 5 Drawing Figs.

[52] U.S. Cl. .................................................. 242/1.1,
74/20, 74/102
[51] Int. Cl. ..................................................... H02k 15/09;
F16h 37/16
[50] Field of Search ........................................... 242/1.1,
1.1(E), 1.1(C), 7.05; 29/203; 74/102, 20

[56] References Cited
UNITED STATES PATENTS
| 2,934,280 | 4/1960 | Mason ........................... | 242/1.1 |
| 2,967,672 | 1/1961 | Zwayer .......................... | 242/1.1 |
| 3,052,418 | 9/1962 | Gorski et al. .................. | 242/1.1 |

*Primary Examiner*—Billy S. Taylor
*Attorney*—Wheeler, Wheeler, House and Clemency ABSTRACT: Machine for winding coils of wire onto internally slotted stator cores and particularly those cores having slots skewed with respect to the stator axis. A tubular wire placing shuttle is repeatedly shifted through the core to lay wire into selected slots and then oscillated in a first direction along an end of the core, followed by retraction of the shuttle to lay wires in a second set of slots whereupon the shuttle is oscillated in the opposite direction along the other end of the core back to the original slots to thereby form wire coils on the core. To place wire into slots skewed with respect to the stator axis, an adjustably slotted cam shaped in accordance with slots of the stator to be wound is placed along a portion of the shuttle to coact with roller cam followers connected to the shuttle. The coaction between said cam and followers shifts the shuttle in accordance with the shape of the slots.

Patented Nov. 10, 1970

3,539,121

Inventor
Robert W. Peters
By Wheeler, Wheeler, House & Clemency
Attorneys 3,539,121

MACHINE FOR WINDING STATORS WITH SKEWED SLOTS

BACKGROUND OF THE INVENTION

Coil winding machines of the type contemplated herein are described in my copending application Ser. No. 676,160, filed Oct. 18, 1967 now U.S. Pat. No. 3,524,600. These machines generally have a winding head mounted on the end of a shuttle in axial alignment with the bore of a stator which has a plurality of slots parallel to the axis of the stator. The shuttle is sequentially reciprocated and oscillated in a cyclic manner to move the winding head through the bore of the stator to lay the wire for the coils in the slots in the stator. After each coil is completed the span of the shuttle is automatically adjusted to wind the wire for the next coil. These machines have been thus far limited to winding coils in stators having parallel slots only.

SUMMARY OF THE INVENTION

The present invention is related to a coil winding machine which can be used to wind coils in stators having skewed slots as well as stators having parallel slots. In a coil winding machine of the type contemplated herein, a stator is supported on the front of the machine and a winding head mounted on the end of a shuttle is reciprocated through the bore of the stator to lay wires in the slots of the stator. The winding head is rotated at the end of each stroke so that, during reciprocation in one direction, wire is laid in one slot and so that wire is laid in another slot on the return stroke. This cycle of motion is repeated until the coil is completed. The rotary motion of the winding head at the end of each stroke is produced by a span mechanism which includes a guide tube coaxially mounted on the shuttle and operatively connected to the shuttle by a cam follower mounted on the shuttle. In order to lay wire in the slots of a stator having a skew or twist, the winding head must be turned during the reciprocal strokes of the shuttle. The turning motion of the shuttle is achieved by securing cam guide plates to the guide tube in a position to engage the cam follower mounted on the shuttle. The cam guide plates have curved cam surfaces substantially identical to the curvature of the skewed slots in the stator. Each time the shuttle is reciprocated it will also turn so that the winding head follows the curve of the skewed slots. The guide tube thereby provides both the oscillatory motion required at the end of each stroke and the turning motion required during each reciprocal stroke of the shuttle.

Other objects and advantages will become apparent from the following detailed description when read in connection with the accompanying drawings in which.

Figure 1:
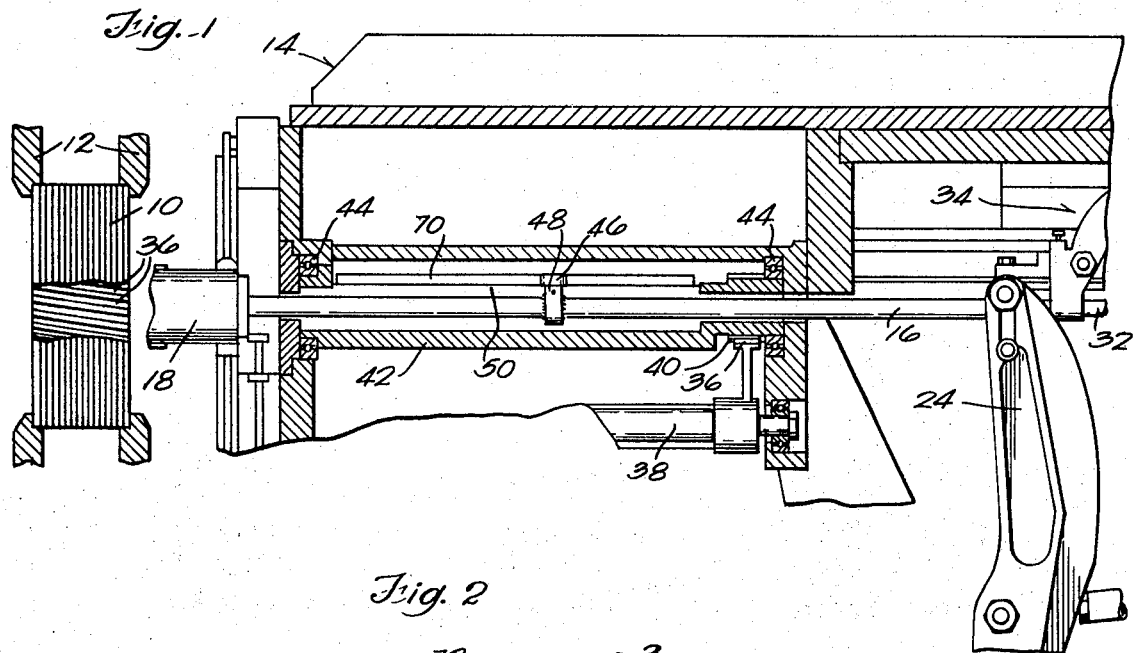
FIG. 1 is a view of a part of a coil winding machine.

Prior to describing the present invention, reference should be made to my copending application Ser. No. 676,160. In that application a hollow shuttle is used to reciprocally move a winding head through the bore of a stator. A needle in the winding head is used to lay the coil wire that is pulled through the shuttle in the slots of the stator. After the wire has been laid in one of the slots in the stator, the shuttle is rotated to align the wire guide needle in the winding head with another slot in the stator and at the end of the return stroke the shuttle is rotated to position the wire guide needle with the first slot. This cycle of motion is repeated until a coil has been formed in the selected pair of slots. During the rotation of the shuttle at the end of each stroke, the wire is held radially outwardly from the bore of the stator to wrap the wire in an arcuate loop across the face of the stator. The same basic reciprocal and oscillating drive system for the shuttle described in my copending application can also be used to reciprocate and oscillate the shuttle in the present invention.

As seen in the drawings, a stator 10 is supported in the machine by holding clamps 12 located on the front of a frame 14 for the coil winding machine. A hollow shuttle 16 is mounted for reciprocal and oscillatory motion in the frame 14 in axial alignment with the bore of the stator with a winding head 18 secured to the end of the shuttle for movement through the bore of the stator. The shuttle 16 is reciprocated by a crank arm 24 which is driven through a predetermined cycle. The crank arm 24 is bifurcated at the upper end to straddle the shuttle 16 and a pair of spaced rollers (not shown) on the end of the crank arm are positioned between spaced collars (not shown) on the shuttle 16. A spindle 32 is axially aligned in the shuttle to actuate the lever arms in the winding head at the end of each stroke. The motion of the spindle is controlled by a back drive assembly 34 mounted on the rear of the frame 14. Since the operation of the spindle, shuttle and winding head forms no part of the present invention, it will not be described further here.

The stator 10 has a number of skewed slots 36 each of which has the same curve or twist. The winding head 18 must be turned as it moves through the bore of the stator so that the wire guide needle follows the curve or twist of the slots. In FIG. 1 the shuttle 16 is shown axially aligned in a guide tube 42 which is mounted for rotary motion in roller bearings 44 in the frame 14. A follower means such as cam roller 46 is mounted on a pin 48 on the shuttle 16 and projects outwardly through a slot 50 in the guide tube 42. The guide tube is normally used to rotate the shuttle 16 at the end of each stroke. A gear 40 is mounted on the guide tube and is engaged by a gear segment 36 mounted on a rock shaft 38. The gear segment and rock shaft are rotated by an oscillatory drive as disclosed in my copending application Ser. No. 676,160.

Figure 2:
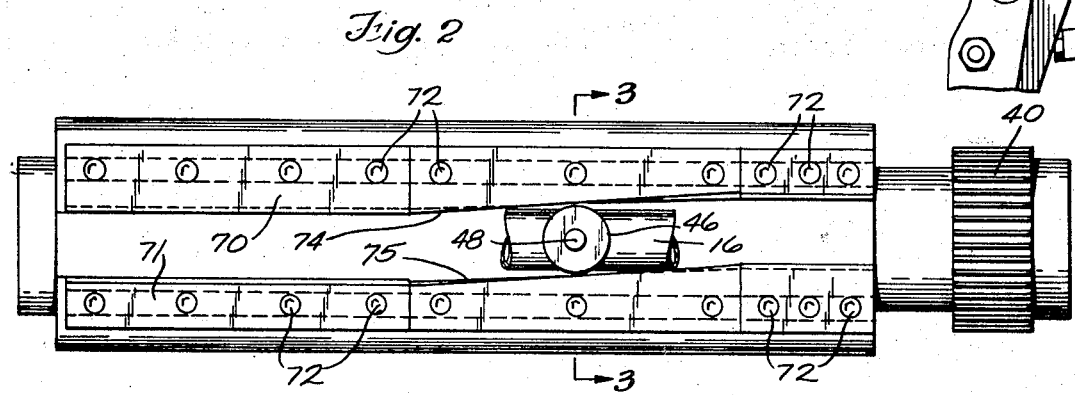
FIG. 2 is a top view of a guide tube and shuttle connection.

The shuttle is turned or rotated during its reciprocal motion by a guide means such as the three piece plates 70 and 71 mounted on the guide tube on each side of slot 50 by a number of screws 72. As seen in FIG. 2 the center plate of each of the guide plates has a cam surface 74, 75 which has the same curve as the skew of slots 36. The cam follower 46 is positioned to engage the cam surfaces 74 and 75. As the shuttle moves axially in the guide tube, the cam follower 46 will follow the curve of the cam surfaces and turn the shuttle.

Figures 3, 4, 5:
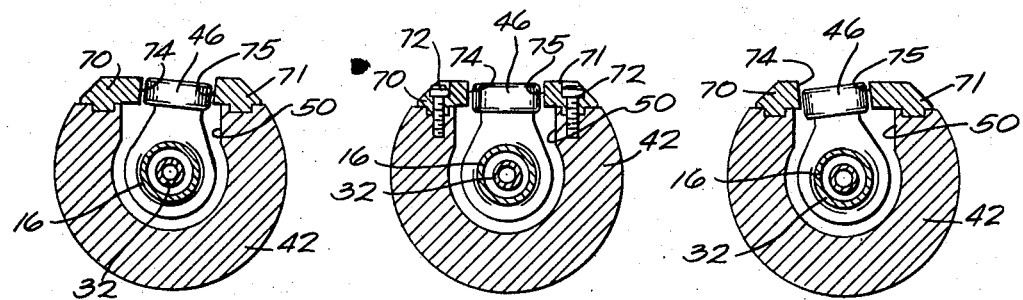
FIG. 3 is a view taken on line 3–3 of FIG. 2 showing the position of the shuttle cam follower in the guide tube.
FIG. 4 is a view of the shuttle turned clockwise in the guide tube.
FIG. 5 is a view of the shuttle turned counterclockwise in the guide tube.

Referring to FIGS. 3, 4 and 5, the cam follower 46 is shown at various positions relative to the guide tube 42. In FIG. 3 the cam follower 46 is shown at the center of the cam surface of the cam guide plates with the cam follower and shuttle centrally located. In FIG. 4 the cam follower 46 is shown at a position to the left of the line 3–3 of FIG. 2 with the shuttle rotated clockwise in the straight sections of the left guide plates. In FIG. 5 the cam follower 46 is shown to the right of line 3–3 of FIG. 2 with the shuttle rotated counterclockwise in the straight section of the right guide plates. FIGS. 4 and 5 also indicate the position of the shuttle when the needle in the winding head emerges from the bore of the stator. It should be noted that the cam surfaces 74 and 75 are twisted through the curved portion of the center plate to assure that the cam follower has a good contact with the cam surface at all times.

The rotation of the guide tube to align the needle with the next slot in the stator is produced by rotating the gear segment 36 as in my copending application Ser. No. 676,160. The coil winding machine can be converted to wind coils in stators having straight or parallel slots by merely removing the cam guide plates 70 and 71 and substituting cam guide plates having straight cam surfaces. Although a rotary cam follower is shown in the drawing, it is also possible to use a sliding type follower.

I claim:

1. A coil winding machine for winding coils in a stator, said machine comprising a guide tube, a shuttle mounted for reciprocal motion in said guide tube, and means for angularly displacing said shuttle in response to reciprocal motion of said shuttle relative to said guide tube at locations intermediate the ends of the reciprocal motion and including a guide on said guide tube and a follower on said shuttle positioned to operatively engage said guide.

2. A coil winding machine for winding coils in a stator having curved slots, said machine comprising a guide tube, a shuttle mounted for reciprocal motion in said guide tube, guide means on said guide tube including a pair of cam plates having cam surfaces corresponding to the curve of the slots in the stator, and follower means on said shuttle positioned to operatively engage said guide means.

3. A coil winding machine according to claim 2 wherein said follower means comprises a cam roller positioned to engage said cam surfaces on said cam plates.

4. A coil winding machine according to claim 2 wherein said cam plates can be varied to accommodate a variety of stators.

5. A machine for winding coils in a stator having curved slots, said machine including a guide tube mounted for oscillatory motion, a shuttle mounted for reciprocal motion in said guide tube, said shuttle including a cam follower, and a cam on said guide tube and engaged with said cam follower for angularly displacing said shuttle in response to reciprocal motion of said shuttle relative to said guide tube.

6. A machine according to claim 5 wherein said cam includes a pair of cam plates positioned to engage said cam follower, each of said plates having a cam surface corresponding to the curve of the slots in the stator.